US007822265B2

(12) United States Patent
Berretty

(10) Patent No.: US 7,822,265 B2
(45) Date of Patent: Oct. 26, 2010

(54) GHOST ARTIFACT REDUCTION FOR RENDERING 2.5D GRAPHICS

(75) Inventor: Robert-Paul Mario Berretty, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1047 days.

(21) Appl. No.: 10/599,821

(22) PCT Filed: Apr. 8, 2005

(86) PCT No.: PCT/IB2005/051164

§ 371 (c)(1),
(2), (4) Date: Oct. 11, 2006

(87) PCT Pub. No.: WO2005/101324

PCT Pub. Date: Oct. 27, 2005

(65) Prior Publication Data

US 2008/0267527 A1    Oct. 30, 2008

(30) Foreign Application Priority Data

Apr. 14, 2004    (EP) .................................. 04101511

(51) Int. Cl.
*G06K 9/00* (2006.01)

(52) U.S. Cl. ........................ 382/154; 382/266; 382/275; 345/419; 345/420; 345/421; 345/422; 345/423; 345/424; 345/426; 345/427

(58) Field of Classification Search .................. 382/154, 382/266, 275; 345/419–427
See application file for complete search history.

(56) References Cited

U.S. PATENT DOCUMENTS 4,925,294 A    5/1990    Geshwind et al.

(Continued)

FOREIGN PATENT DOCUMENTS

EP          1353518 A1 * 10/2003
WO          WO0030039 A1    5/2000

OTHER PUBLICATIONS

Kim et al: "Synthesis of a High-Resolution 3-D Stereoscopic Image Pair From a High-Resolution Monoscopic Image and a Low-Resolution Depth Map"; Proceedings of the SPIE, vol. 3295, Jan. 26, 1998, pp. 76-86, XP008000653.

(Continued)

*Primary Examiner*—Vikkram Bali
*Assistant Examiner*—Daniel Zeilberger

(57) ABSTRACT

An image processing system for performing a transformation of an input image associated with an input viewpoint to an output image associated with an output viewpoint. The input image is a pre-filtered 2D representation of 3D objects as seen from the input viewpoint, and comprises for each input pixel an associated input pixel value and an associated input pixel depth. Additional to the input image a hidden image is received, being another 2D representation of the 3D objects and comprising information, which information is occluded from the input viewpoint.

The system comprises a video processor being operative to create the output image by transforming each input pixel to a transformed input pixel. The transformation is a function of the input pixel depth. The output image is created, based on the transformed input pixels, using hidden image pixels for filling de-occluded areas and for at least one pixel position adjacent to the de-occluded areas. As a consequence ghost line artifacts, caused by transformation of the pre-filtered input image, are prevented.

16 Claims, 16 Drawing Sheets

U.S. PATENT DOCUMENTS 5,929,859 A * 7/1999 Meijers ................... 345/419
6,466,205 B2 * 10/2002 Simpson et al. ............ 345/419

OTHER PUBLICATIONS

Tzovaras et al: "Disparity Field and Depth Map Coding for Mutiview 3D Image Generation"; Signal Processing: Image Communication, Elsevier Science Publishers, vol. 11, No. 3, Jan. 1998, pp. 205-230, XP004107304.

Curti et al: "3D Effect Generation From Monocular View"; Proceedings of the First International Symposium on 3D Data Processing Visualization and Transmission, Jun. 19, 2002, pp. 550-553, XP002297656.

* cited by examiner

GHOST ARTIFACT REDUCTION FOR RENDERING 2.5D GRAPHICS

FIELD OF THE INVENTION

This invention relates to an image processing system for generating at least one output image associated with an output viewpoint from an input image associated with an input viewpoint through a depth-dependent transformation, the images being represented as an input pixel array and an output pixel array, respectively.

This invention further relates to a method and a computer program product.

BACKGROUND OF THE INVENTION

The interest in providing a depth sensation when displaying an image on a 2D display is growing rapidly, notably in virtual reality applications and computer games. Various forms of providing depth cues, such as influencing the brightness level or the size of an object, are known. Particularly, stereopsis, or stereoscopic vision, receives much attention as a technique for providing depth sensation. Stereopsis is evoked by presenting to a person two 2D images of the same scene as observed from two positions a little way apart. One of the images is presented to the left eye, the other one is presented to the right eye. The two images are parallactically related. The term "parallax" refers to the apparent displacement or the difference in apparent direction of an object as seen from two different points not on a straight line with the object. Parallax allows a person to perceive the depth of objects in a scenery.

Many display techniques for displaying stereoscopic images are known. Using a time-parallel technique, both output images are presented simultaneously to one or two displays. For example, both images may be filtered with complementary colors and superimposed on one display. The observer wears glasses with filters that match the projection filters. Alternatively, both images may be displayed alongside on one display and viewed using a viewer which directs each image to the correct eye. As another example, two displays may be used to present two differently polarized pictures, which are viewed through correspondingly polarized glasses. Alternatively, both images may be presented using a head-mounted device with separate displays for each eye. Also time-multiplexed techniques may be used, where the left and right images are alternatingly displayed on one display. As an example, one image is written to the even scan lines of a monitor and the other image to the odd scan lines. A shutter system is used to occlude the left eye when the right-eye image is displayed and to occlude the right eye when the left-eye image is displayed. The shutter system may be mounted in glasses worn by the observer. Alternatively, a shutter with a controllable polarizer is placed in front of the display and the observer wears a head-mounted device with polarized glasses.

A possible video format that is suited for rendering a 2D image from different viewpoints is a 2D video format enriched with depth information. Typically, the 2D input image is given in the form of an array of pixels. It may, for instance, have been obtained using a camera or computer graphics. For each of the pixels of the input image additional depth information is available or, similarly, for each point in the scene, a distance is given of the point to the camera (or to another reference point, line or plane, such as a projection screen). Such a format is usually referred to as a 2.5D video format. The depth information allows modeling of the original image as a set of samples of a flat image, but also as a set of samples of an image projected onto a terrain. FIG. 2A shows a cross section of the sampled terrain. From the camera position a ray is cast to each pixel of the screen. The lengths of the arrows along the rays indicate the depth values of the pixel samples, also referred to as texels (texture elements). The 2.5D video format represents a subset of the full 3D model of the world. Rendering from other viewpoints can be accomplished by projecting the terrain onto the image plane from the desired viewpoint. Based on the parallax when observing the same object from the visual point of the eyes and from the camera point, the pixels of the left eye image and the right eye image can be derived from the pixels of the input image by shifting the pixels. By choosing the horizontal axis of the coordinate system as being parallel to the line connecting both eyes, only a horizontal shift occurs. The amount of shift of a pixel depends on the depth information. FIG. 2B shows that after viewpoint transformation, the density of the projected input pixels is not uniform in the output domain. Hence, a resampling procedure is required. Existing video processing hardware/software designed for processing broadcast video signals is able to yield high-quality output images. Such hardware/software is able to scale an image to different display formats, such as 4:3 and 16:9 and perform resampling and band limiting of the signal for such a conversion. The video processing usually occurs per horizontal scan line of the image.

SUMMARY OF THE INVENTION

It is an object of the invention to provide a video processing system and method capable of performing a viewpoint transformation without introducing visual artifacts.

To meet the object of the invention, an image processing system as described in the first paragraph is provided comprising: an input for receiving the input image and a hidden image, a video processor being operative to create output pixels of the output image and an output for providing the output image for subsequent rendering. The input image is a pre-filtered 2D representation of 3D objects as seen from the input viewpoint and comprises for each input pixel an associated input pixel value and an associated input pixel depth. The hidden image is another 2D representation of the 3D objects and comprises information, which information is at least partly occluded from the input viewpoint. The video processor is operative to create the output pixels by transforming each input pixel to a transformed input pixel, associated with the output viewpoint, as a function of the input pixel depth and creating the output image based on the transformed input pixels, using hidden image pixels for filling de-occluded areas and for at least one pixel position adjacent to the de-occluded areas for preventing ghost line artifacts, caused by transformation of the pre-filtered input image.

The input image may, for example, be obtained from the input viewpoint by a video camera and the hidden image may then be obtained from a viewpoint, different from the input viewpoint, by another camera. The input image and the hidden image may, for example, also be computer generated based on a 3D model of a particular scene. The hidden image may be a complete 2D representation of the 3D scene, as seen from a given viewpoint. The hidden image may also comprise only information, which information is occluded from the output viewpoint, and is required for only one or a few pre-determined transformations.

De-occlusion may occur at depth discontinuities in the input image. Due to pre-filtering of the camera that records the original video, the pixels in the vicinity of the depth discontinuity contain color from both the foreground and the background objects in the input image. Therefore, simply filling the hole with de-occluded pixels from the hidden layer will result in a noticeable ghost line artifact. It is an advantage of the image processing system according to the invention that ghost line artifacts near the de-occluded hidden image pixels are prevented. This advantage is obtained by rendering a larger part of the hidden layer for replacing transformed input pixels adjacent to the de-occluded parts of the hidden layer. The hidden image pixels in the larger part of the hidden layer are inserted into the output image instead of the corresponding transformed input pixels.

In an embodiment of the invention the depth-dependent transformation is a transformation from the input viewpoint to a predetermined output viewpoint and the hidden image is associated with the output viewpoint. The predetermined distance may for example be a distance between a left and a right eye for providing a depth sensation. The input image may be obtained by a first camera in a position of a left eye viewpoint and the hidden image by a second camera in a position of a right eye viewpoint. Not all information recorded by the second camera has to be stored in the hidden image. Only information in and adjacent to the areas that are de-occluded with a transformation from the left eye input viewpoint to the right eye output viewpoint has to be stored in the hidden image. After transformation of the input image, this information is used to fill the de-occluded areas in the output image and to prevent ghost line artifacts near the de-occluded areas.

In another embodiment the hidden image is associated with the input viewpoint and the hidden image pixels are associated with a hidden image pixel value and a hidden image pixel depth, the video processor being operative to transform each hidden image pixel to a transformed hidden image pixel, associated with the output viewpoint, as a function of the hidden image pixel depth, and to create the output image using transformed hidden image pixels for filling de-occluded areas and for at least one pixel position adjacent to the de-occluded areas. This embodiment is particularly useful for providing the possibility to perform various transformations over various distances. The input image may be obtained from a first viewpoint by a first camera and the hidden image from a second viewpoint by a second camera. Preferably the information recorded by the second camera is then transformed to the first viewpoint. As a consequence the input image and the hidden image are thus associated with the same viewpoint. From this viewpoint both images may undergo the same transformation to an arbitrary output viewpoint.

In a preferred embodiment the image processing system comprises pixel selection means for sequentially selecting input pixels per row. The pixel selecting means are arranged for selecting a hidden image pixel for pixel positions in a de-occluded area, for a first number of pixel positions before the de-occluded area and for a second number of pixels after the de-occluded area. For other pixel positions on the display line, transformed input pixels are selected. The first and/or second number of pixel positions may depend on a width of a horizontal pre-filter, used during recording of the input image or may be determined based on an analysis of the input image.

Sequentially processing the pixels per row in a direction opposite a displacement from the input viewpoint to the output viewpoint makes it easy to detect occlusion. This can be done by maintaining an x-coordinate extent indicating a furthest x-coordinate of the pixels and their footprints that have been transformed so far. If the transformation of the next footprint results in increasing the extent the transformed next footprint is at least partly not occluded. In this way it can be decided easily whether or not to exclude a pixel from the output image. Preferably, the x-axis is horizontal and the camera displacement also. If so desired, other directions are possible as well. The video processor is operative to determine that a hidden image pixel is de-occluded if a transformed input pixel increases the x-coordinate extent by more than a predetermined threshold. Preferably, if the x-coordinate of the input pixel after transformation is more than 1.5 pixels away from the last pixel position in the output image, the hole is too big and is filled with at least one pixel from the hidden layer. Since it is desired to use pixels from the hidden layer for pixel positions before the de-occluded area, a means is needed to detect the de-occlusion before the transformed input pixels of the input image are enclosed in the output image. Backtracking is usually not possible because color values are accumulated in the video filter. For early detection of the de-occluded area, the video processing may include maintaining a look ahead extent.

DETAILED DESCRIPTION OF THE PREFERRED EMBODIMENT

Figure 1:
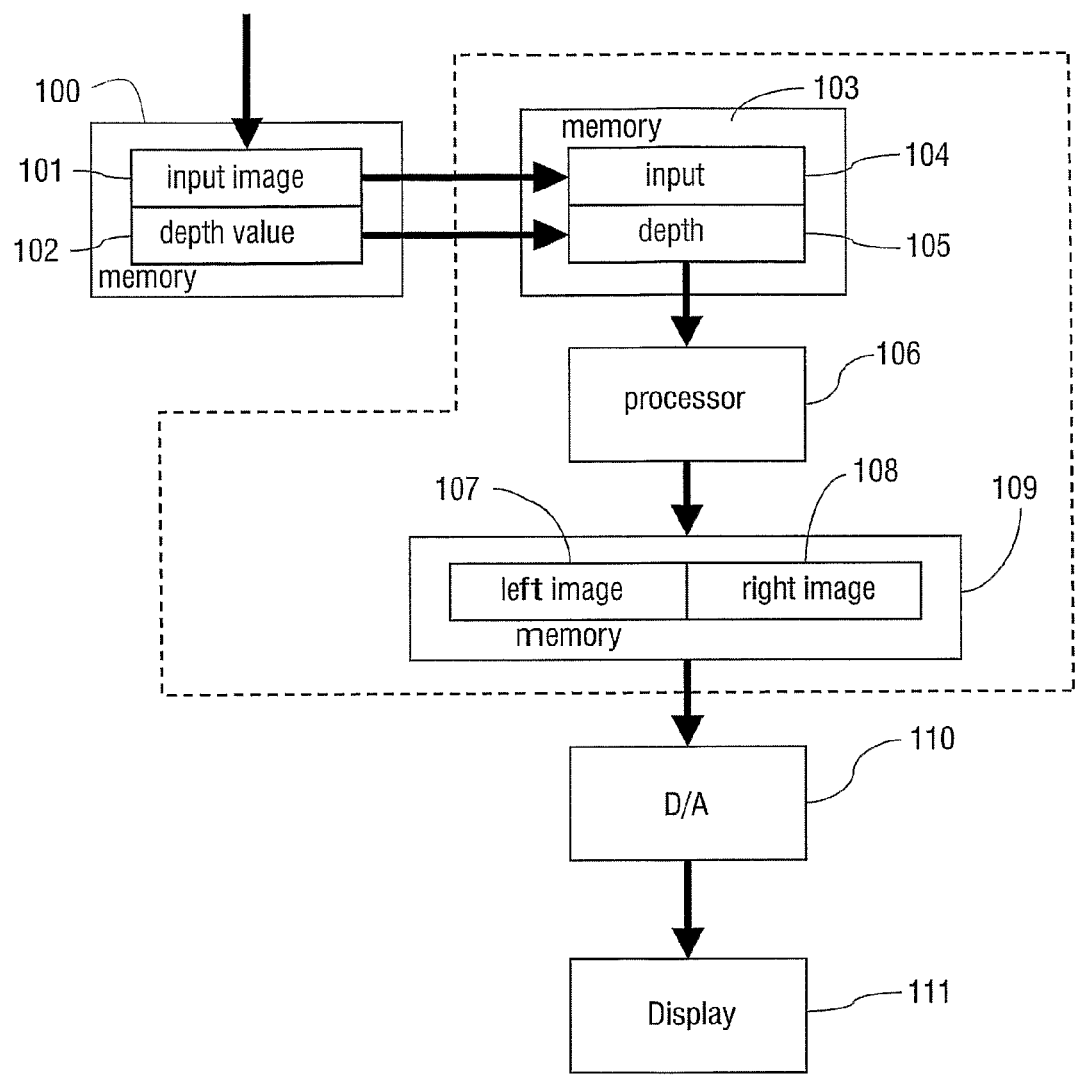
FIG. 1 shows a block diagram of a conventional system incorporating an image processing system.

To explain the system according to the invention, with reference to FIGS. 1 to 5, depth dependent transformation will be described. In this general description a pixel is regarded as a point (dimensionless). FIG. 1 shows a block diagram of a conventional system in which the image processing system according to the invention may advantageously be used. The conventional system comprises a memory 100, such as a graphics memory, for storing a 2D input image 101. The input image 101 is comprised of an array of pixels divided in rows and columns. For each pixel a pixel value is given. Various ways of representing a pixel value are well known, such as an RGB (Red, Green, Blue) or YUV coding. The pixel value may be stored in full, e.g. using 16 or 24 bits per pixel. Alternatively, a Color Look-Up Table (CLUT) scheme may be used to code the pixel value using fewer bits, e.g. 8 bits. In addition to the pixel value, for each pixel a depth value is stored in the memory 100 as the input depth 102. The depth value may, for instance, be stored using 16 bits per pixel. If required, a separate memory may be used for storing the input depth 102. The input image 101 and the input depth 102 may be generated in any suitable way. As an example, two cameras located at different positions may be used, preferably each representing a different eye. From the two 2D-images obtained by the cameras, one image plus depth information can be formed. The depth information can then be supplied in addition to and, preferably, compatible with the conventional supply of only one 2D image, allowing the scene to be observed using either a conventional 2D display system or a stereoscopic display system. On a game computer or personal computer the input image 101 and the input depth 102 are usually generated by a 3D-rendering process which derives the information from a 3D model stored in a memory. Typically, the memory is part of the main memory of the computer. Communication means, such as a telecommunication means, audio/video broadcasting or a cable network, may be used to supply the input image 101 and the input depth 102 to the image processing system.

A processor 106 uses the input image 101 and the input depth 102 to generate at least one output image. In the example shown in FIG. 1, a left image 107 and a right image 108 are generated. The left image 107 represents a 2D representation of the 3D scene as observed from an observation point coinciding with the left eye of an observer. Similarly, the right image 108 represents a 2D representation of the 3D scene as observed from an observation point coinciding with the right eye of an observer. The processor 106 may build the output images in a memory 109, such as a graphics memory. The system according to the invention enables processing per pixel row, reducing the memory requirements. The memories can therefore be formed using line buffers for storing only one scan line of an image. As such, the image data can be processed as stream. If vertical filtering is applied, a few rows need to be stored. Usually a D/A converter 110 presents the output images on a suitable display 111, such as a stereoscopic display. In a broadcast receiver, the processor 106 may operate on the input image and input depth time-synchronized at pixel level to the supply of this information. The synchronization may be loosened by using a memory 103 for storing an input image 104 and input depth 105, being a respective copy of the input image 101 and input depth 102. The processor 106 then operates on the input image 104 and input depth 105, independent from the supply of the input image 101 and input depth 102. At suitable moments, e.g. when a complete new image has been created, the input image 101 and the input depth 102 are copied to the respective input image 104 and input depth 105. In a situation where the memory 100 and the memory 103 are physically combined in one memory block, the copying may be performed without physically copying the data, for instance by reassigning pointer registers. It will be appreciated that instead for maintaining a full image copy also a few pixels of a row or a few rows may be stored depending on the filter being applied.

The depth dependent transformation of the input image into the output image is associated with displacements of 3D objects relative to each other. The transformation described here is also referred as a parallactic transformation. The displacements occur as a consequence of, e.g., a change in the location of the observer relative to the scene, a change in the orientation of the observer relative to the scene, changing positions of the objects relative to each other due to their relative velocities, or a combination of these changes.

Figure 2A:
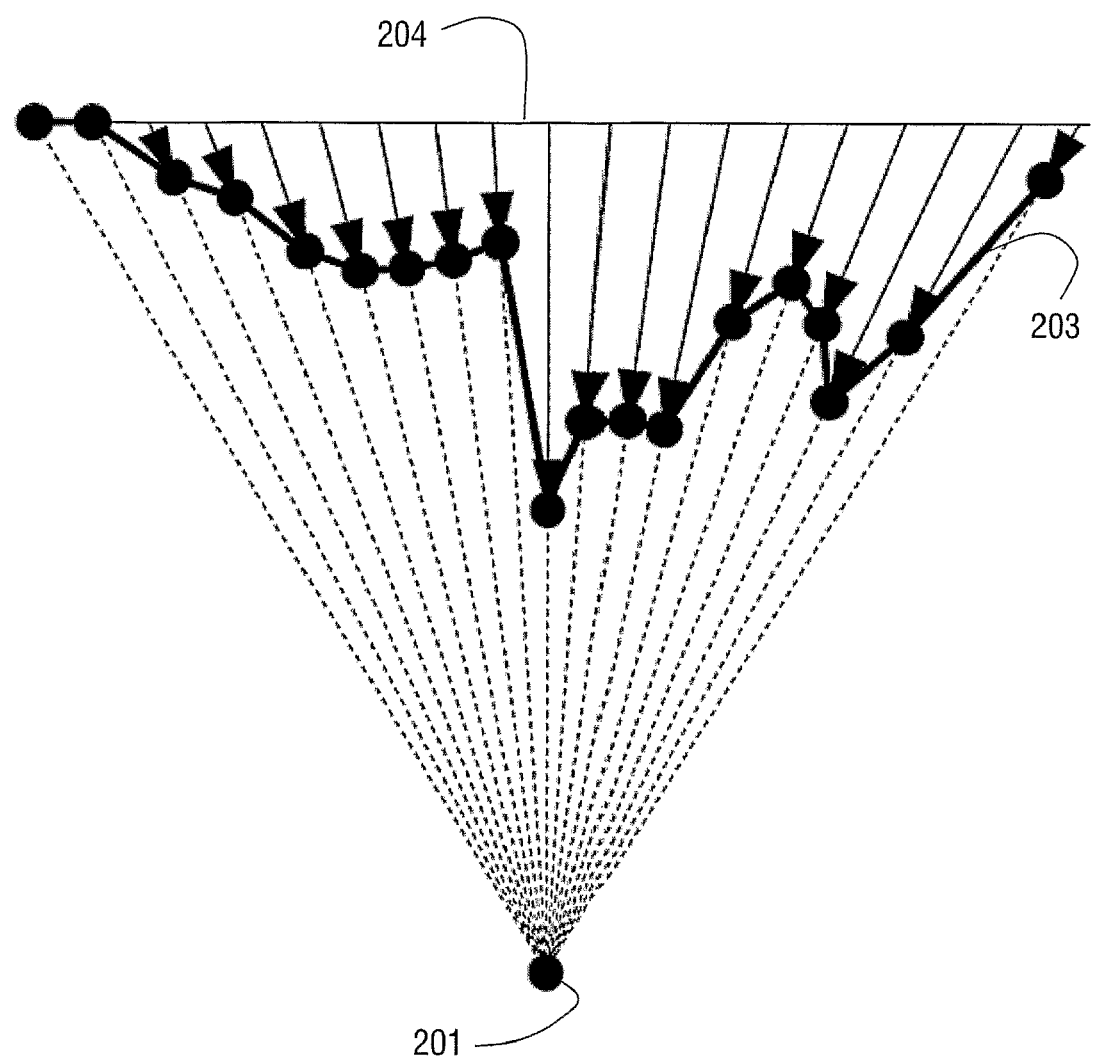
FIGS. 2A-2B show a terrain viewed from different viewpoints.
Figure 2B:
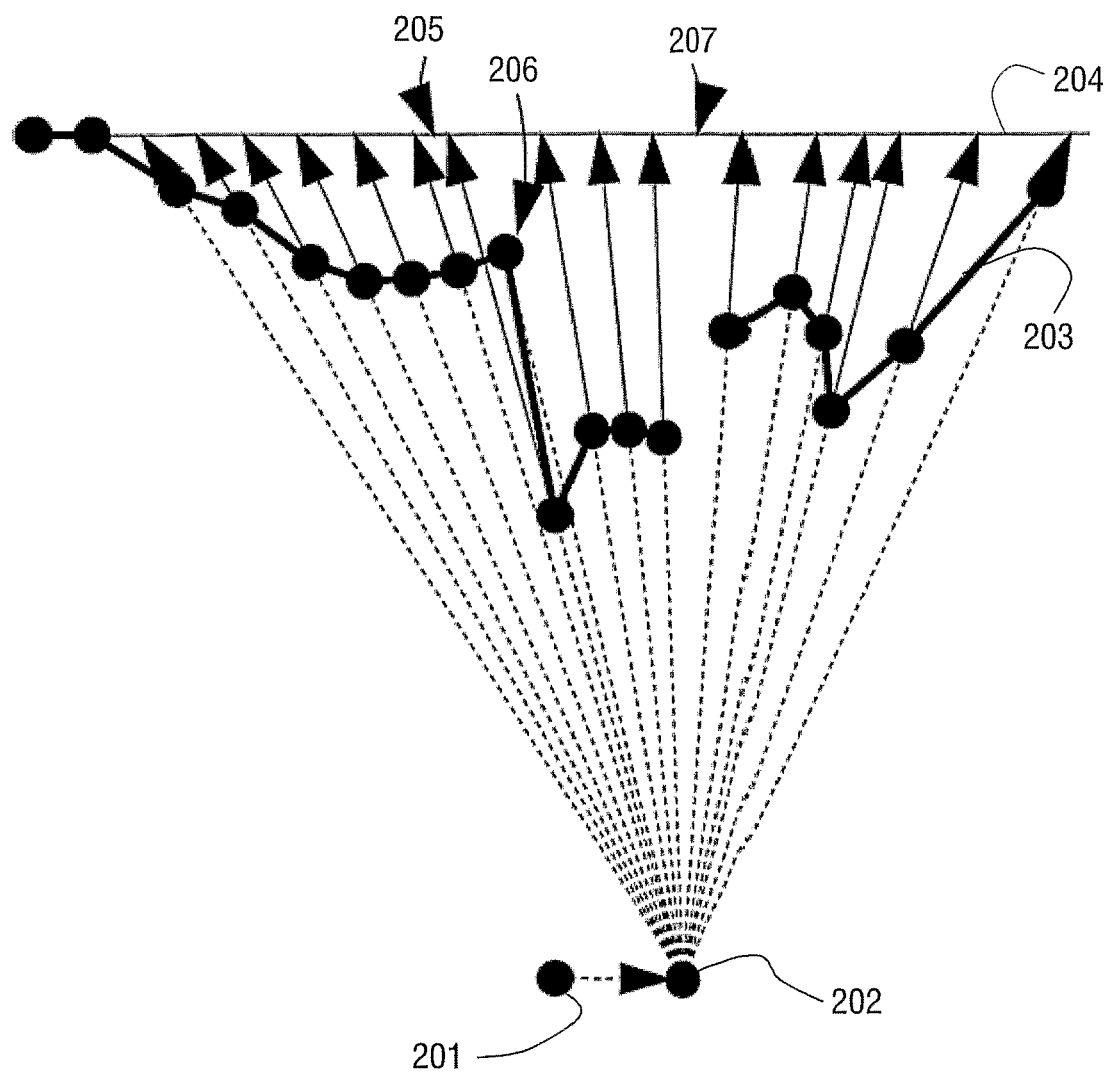

FIG. 2A shows a terrain 203 seen from a camera viewpoint 201 and projected on an image plane 204. Normally, the image plane is formed by uniform pixels (with possibly a different density in x and y direction). In this example, for each pixel of the image plain the corresponding texel (texture element) of the terrain is determined (intersection of the ray from the camera to the pixel through the terrain). Depth may be represented in any suitable form (e.g. representing a length from the texel to the pixel, distance of texel to camera, distance of texel to projection plane, etc). The depth may also be coded in any suitable form, for instance, a 16-bit encoding on a linear scale may be used, where the depth of an object with minimum allowed depth is encoded as 0000H (hexadecimal) and the depth of an object with maximum allowed depth is encoded as FFFFH. Persons skilled in the art will be able to select appropriate other representations, if so desired. FIG. 2B illustrates what happens if the same terrain is viewed from a viewpoint 202. As will be clear, occlusion 206 (texel is no longer visible), minification 205 and magnification 207 may occur. The same holds if the original object was not a terrain but true 3D objects.

Figure 3A:
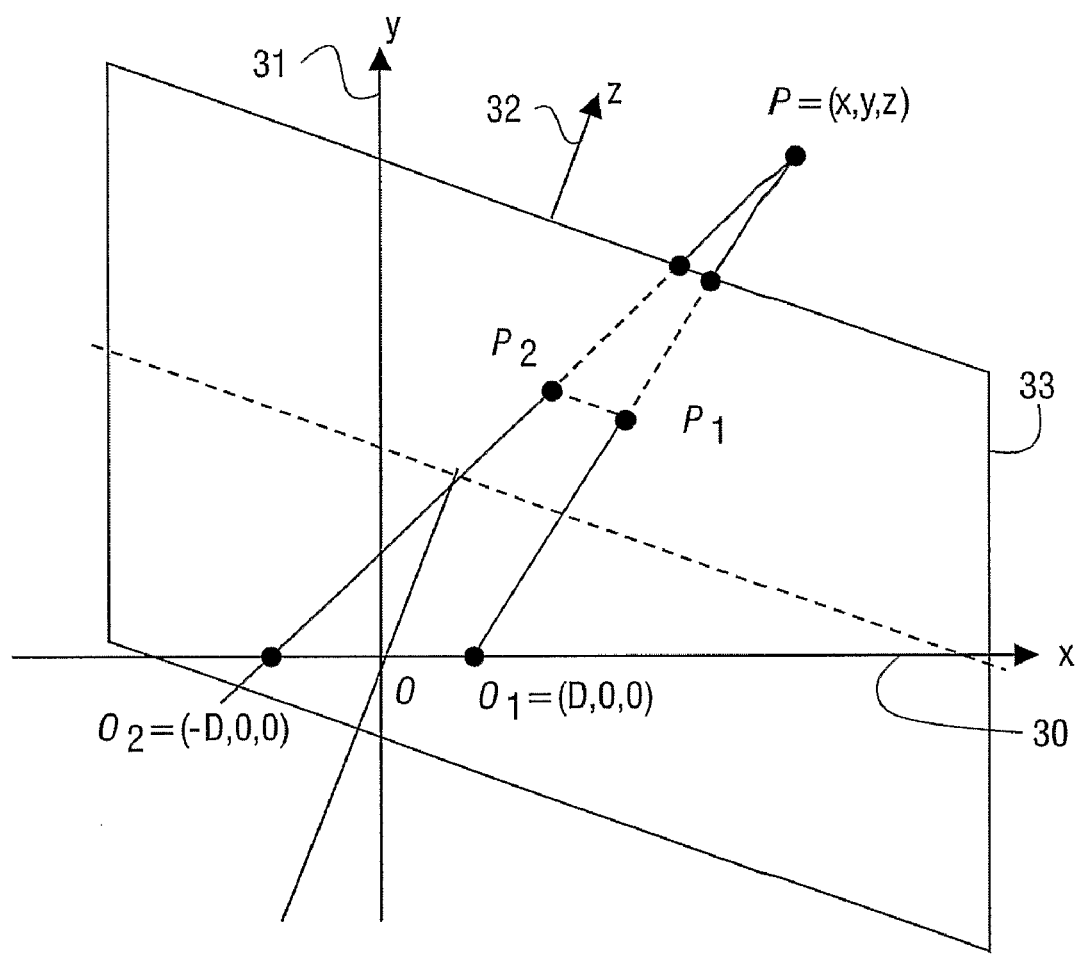
FIGS. 3A-3C show a perspective projection.

FIG. 3A shows a perspective projection. Shown is a 3D coordinate system with an x-axis 30, y-axis 31 and a z-axis 32. A 2D image is comprised of an array of discrete pixels arranged in rows and columns. Pixels in this context are the smallest entities considered by the image processing according to the invention. Each respective pixel of a specific row in the image can assume only a respective one of a series of discrete positions. Each row of pixels in an image runs parallel to the x-axis 30, so that individual pixels in a row are discriminated on the basis of their respective x-coordinates. Each column of pixels runs parallel to the y-axis 31 that points in a direction perpendicular to the x-axis 30. The depth of the scene is measured along the z-axis 32, which runs perpendicular to both the x-axis 30 and the y-axis 31. A respective z-value is assigned to each particular pixel in order to represent the depth of the scenery for that particular pixel. For explaining the parallactic shifting of pixels, the origin O=(0, 0, 0) and the orientation of the coordinate system are chosen such that a 3D-object, represented by the point P=(x, y, z) is observed from the observation point $O_1$=(D, 0, 0). The plane $z=z_p$ is chosen to be the focus plane 33 (the plane on which the eyes of the observer focus). Usually, the plane of the display is chosen to coincide with the focus plane. The 2D image observed from the observation point $O_1$ is formed by a projection of the 3D objects on the focus plane, which is also referred to as the projection plane. The point P is projected onto $P_1=(x_p, y_p, z_p)$.

Figure 3B:
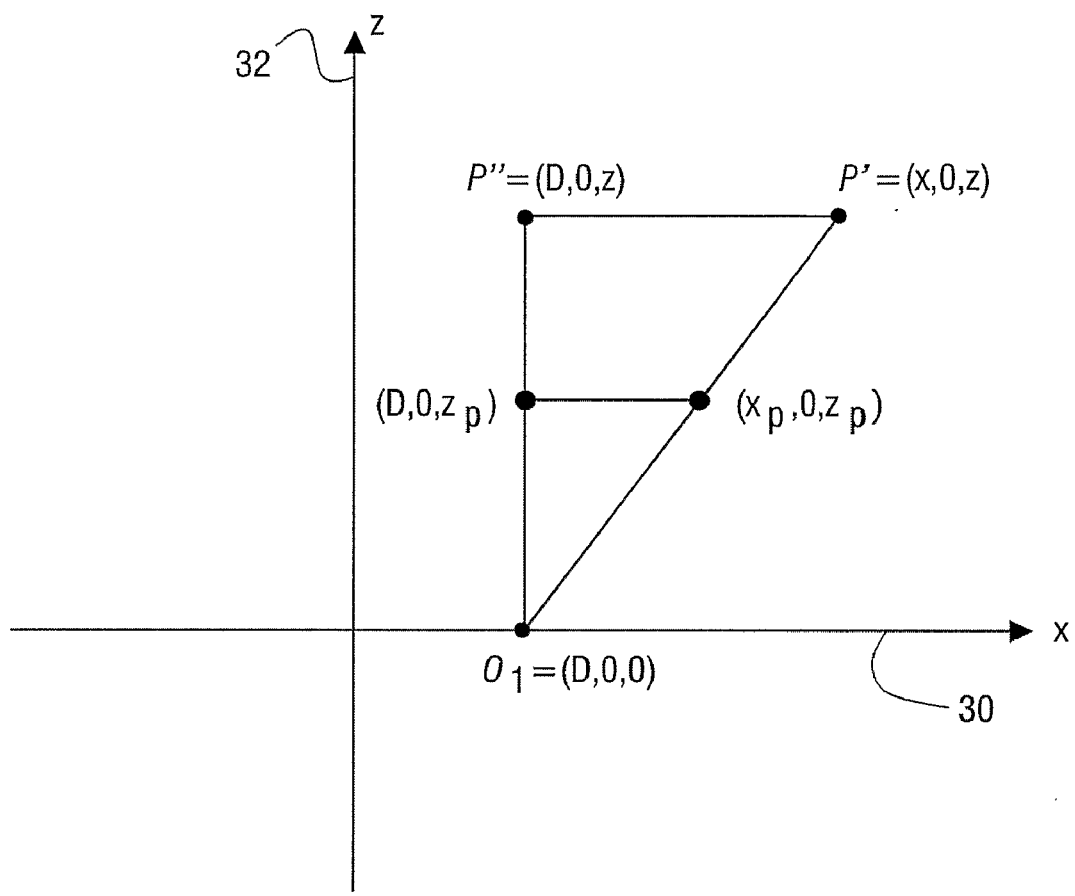

FIG. 3B shows a projection of FIG. 3A onto the plane y=0. P is projected onto P'=(x, 0, z); P'''=(D, 0, z) is a projection of P' on the plane x=D. From the triangle $O_1$, P', P'' it follows that: $z_p/z=(x_p-D)/(x-D)$, giving $x_p=D+(x-D).z_p/z$.

Figure 3C:
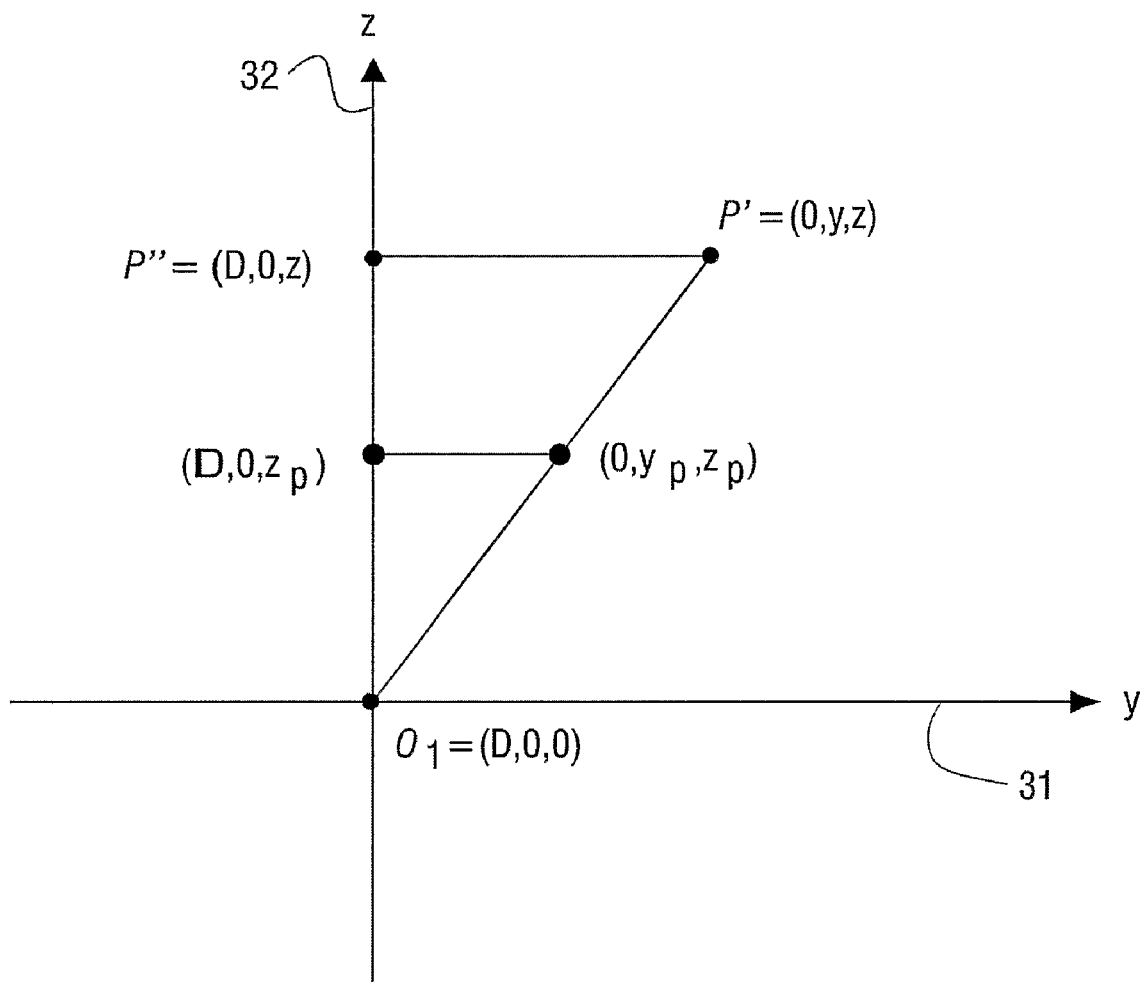

FIG. 3C shows a projection of FIG. 3A onto the plane x=D. P is projected onto P'=(D, y, z); P'''=(D, 0, z) is a projection of P' on the plane y=0. From the triangle $O_1$, P', P'' it follows that: $z_p/z=y_p/y$, giving $y_p=y.z_p/z$.

This gives that $P_1=(D+(x-D).z_p/z, y.z_p/z, z_p)$. Similarly, $P_2=(-D+(x+D).z_p/z, y.z_p/z, z_p)$. Similar formulas are given in [IEEE Computer graphics & Applications, Tutorial: Time-Multiplexed Stereoscopic Computer Graphics, March 1992]. From the formulas, it follows that by choosing the x-axis to be parallel to the line through the observation points, the y coordinates of $P_1$ and $P_2$ are the same. So, when deriving an image observed from $O_2$ from the image observed from $O_1$, no vertical parallax occurs. In general, by choosing the x-axis in this way the calculation of the parallax is simplified. The pixels of the output image can be derived from the input image. Assuming that the input image corresponds with the image as observed from $O_1$ and the output image corresponds with the image as observed from $O_2$. Assuming further that for input pixel $p_i=(x_i, y_i)$ the pixel value is given, as well as the depth $z_i$ of the 3D point $P(x_i, y_i, z_i)$ from which $p_i$ is derived.

The corresponding output pixel $p_o=(x_o, y_o)$, with $y_o=y_i$, is related to the same 3D point $P(x, y_i, z_i)$. This gives:

$$x_i = D + (x-D) \cdot z_p/z_i, \text{ and}$$

$$x_o = -D + (x+D) \cdot z_p/z_i.$$

This implies that $x_o$ can be derived from $x_i$ in the following way:
$x_o = x_i - 2 \cdot D + 2 \cdot D \cdot z_p/z_i = x_i + 2 \cdot D \cdot (z_p/z_i - 1)$. The output image can, therefore, be derived from the input image by performing a horizontal shift d (only in the x-direction) of:

$$D = 2 \cdot D \cdot (z_p/z - 1). \tag{1}$$

From this formula it can be observed that the shift is proportional to the inverse of the depth. In the formula, 2.D corresponds to the offset between the observation points $O_1$ and $O_2$.

Figure 4A:
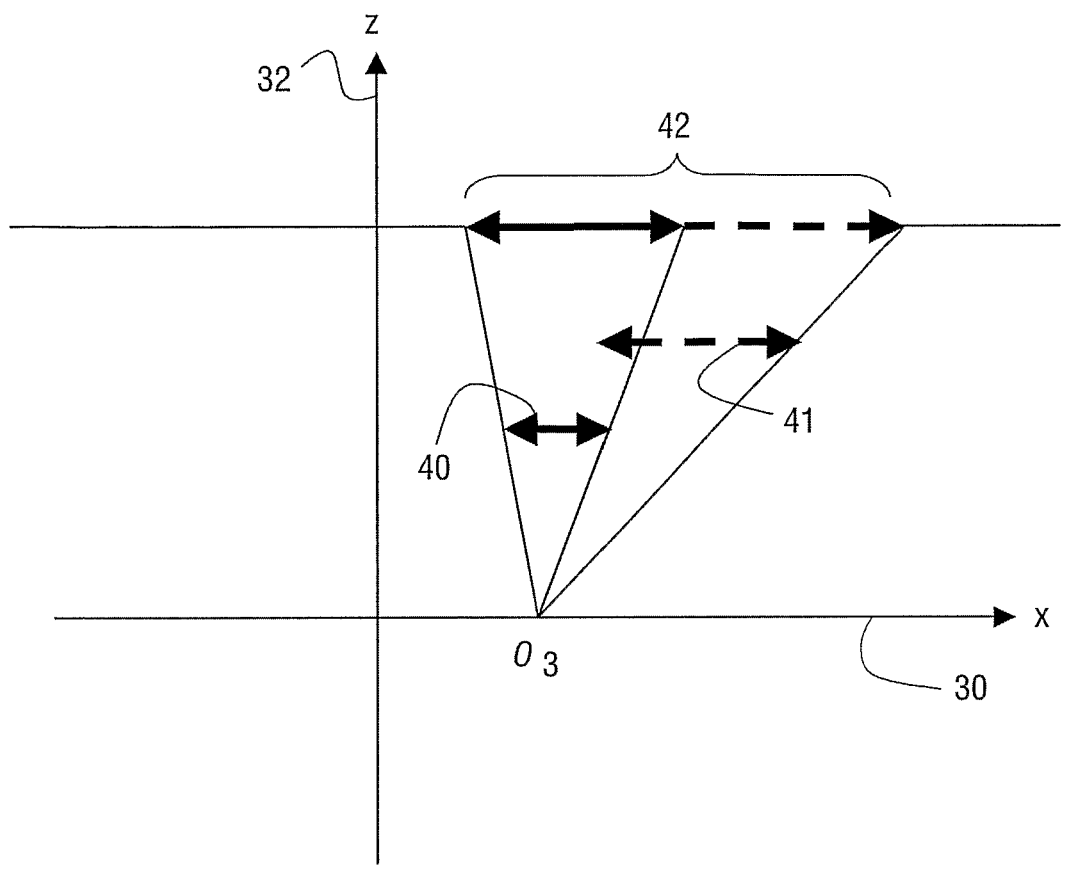
FIGS. 4A-4B illustrate increased overlapping of objects when observed from different viewpoints.
Figure 4B:
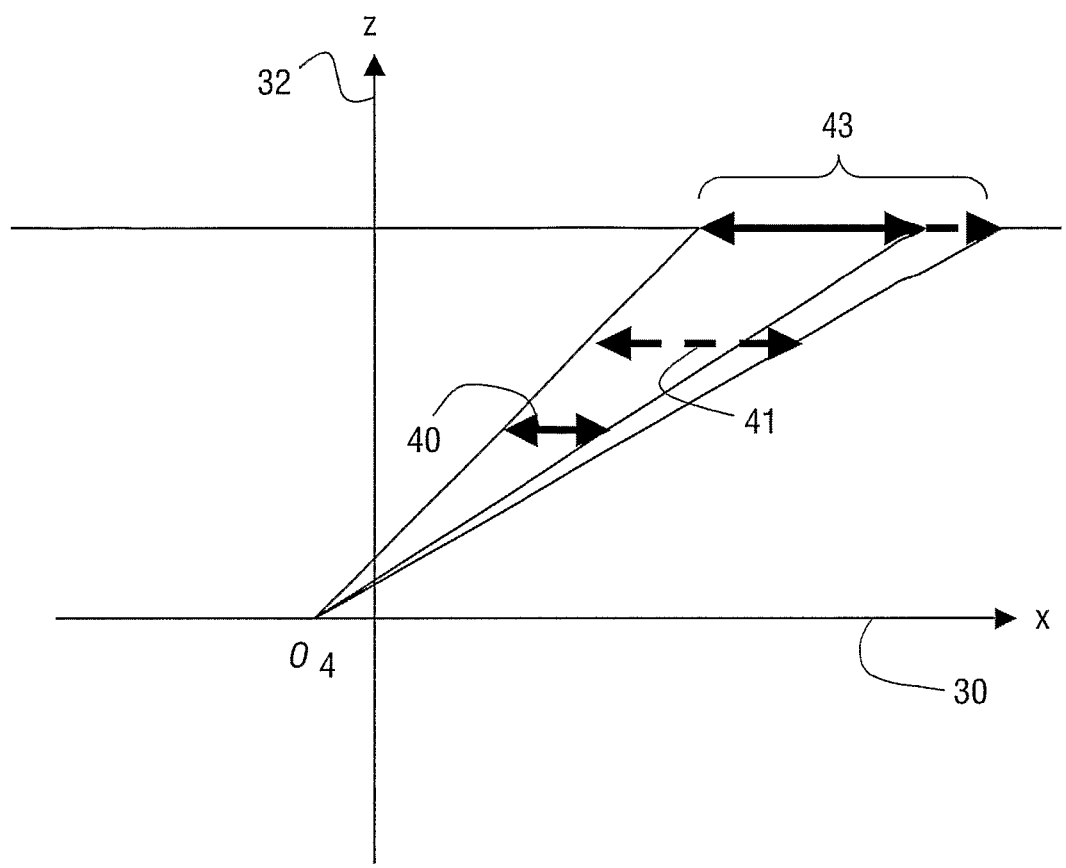

FIG. 4A shows a scene observed from an observation point $O_3$, corresponding to the input image, wherein a nearby object 40 is partially overlapping a further object 41. For clarity, the y-coordinates are not shown in the figure. Due to the overlapping, the input image comprises all pixels of the nearby object 40 and only some pixels of the further object 41, as illustrated by the observed image 42. FIG. 4B shows the same scene observed from an observation point $O_4$, which corresponds to the output image 43. As is clear from FIG. 4B the overlap has increased. If the output image 43 of FIG. 4B is derived from the input image 42 of FIG. 4A, this increased overlap will be reflected by at least one input pixel corresponding to the background object 41 partly or totally being occluded by an input pixel corresponding to the foreground object 40. In the areas of overlap there are several candidates for the pixel values in the output image. The system according to the invention uses a reconstruction filter to determine for the output pixel locations (i.e. according to the grid of the output image) the input pixel(s) that after transformation contribute(s) to the output pixel location.

Figure 5A:
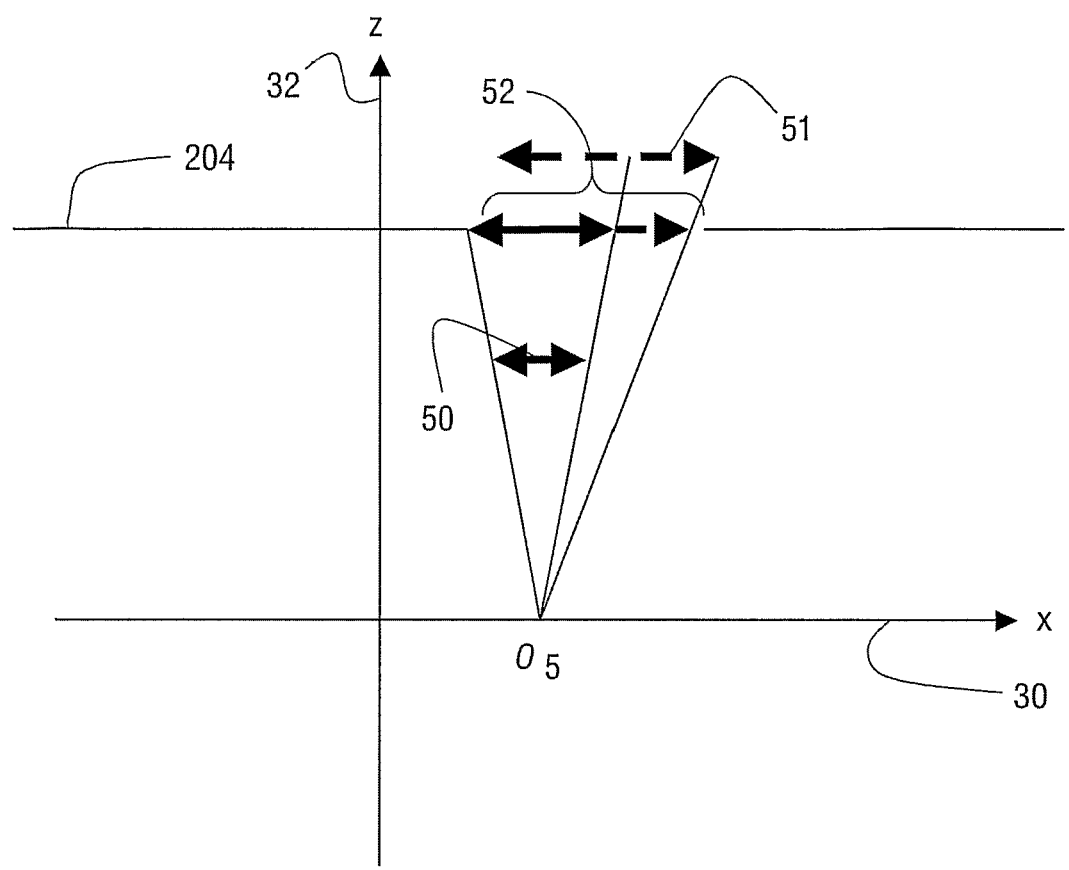
FIGS. 5A-5B illustrate the appearance of a de-occluded area when objects are observed from different viewpoints.
Figure 5B:
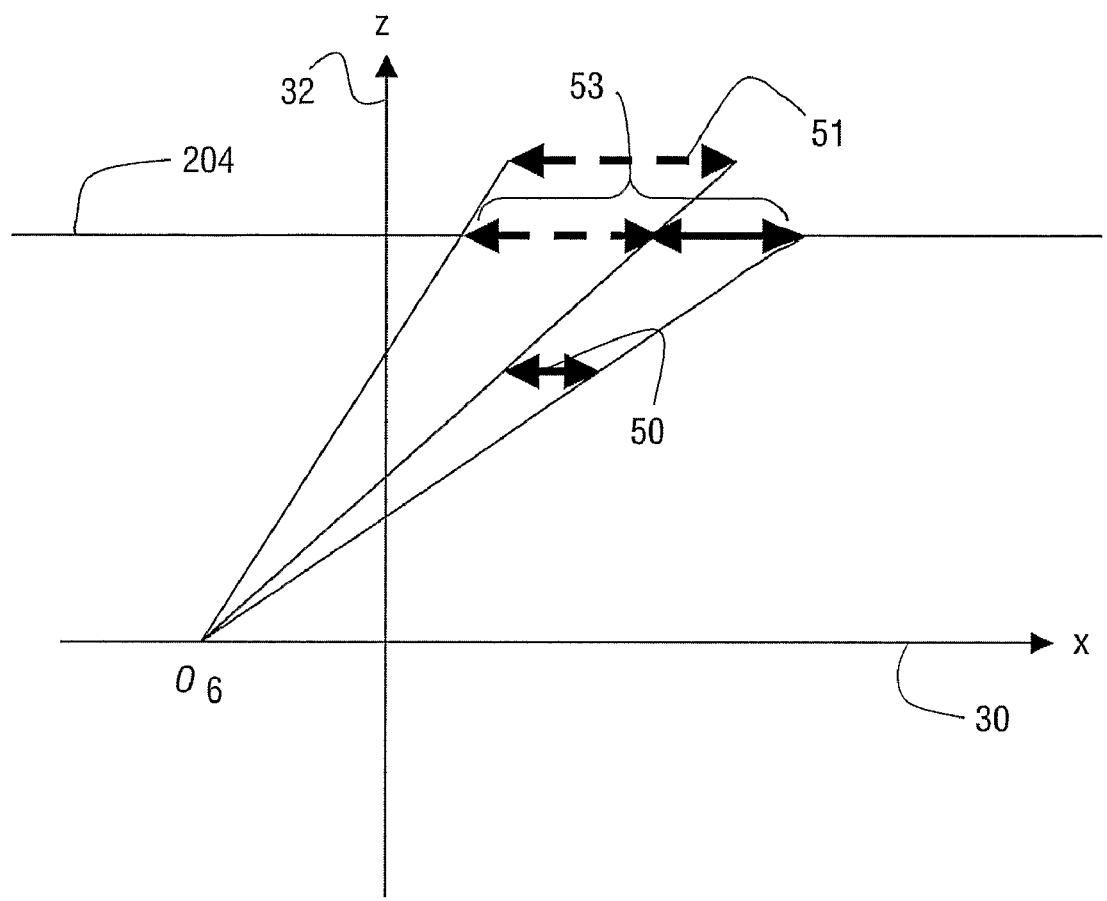

In contrast to different pixels of the input image being shifted to the same output pixel position, FIG. 5 shows an example wherein a 'hole' occurs in the output image 53 due to the fact that no input pixel is present to fill a position in the output image 53. FIG. 5A shows that in the input image 52 a background object 51 is partly obscured by a foreground object 50. In FIG. 5B no overlap occurs between the objects 50 and 51 as can be observed from the output image 53, seen from an observation point $O_6$.

Figure 6:
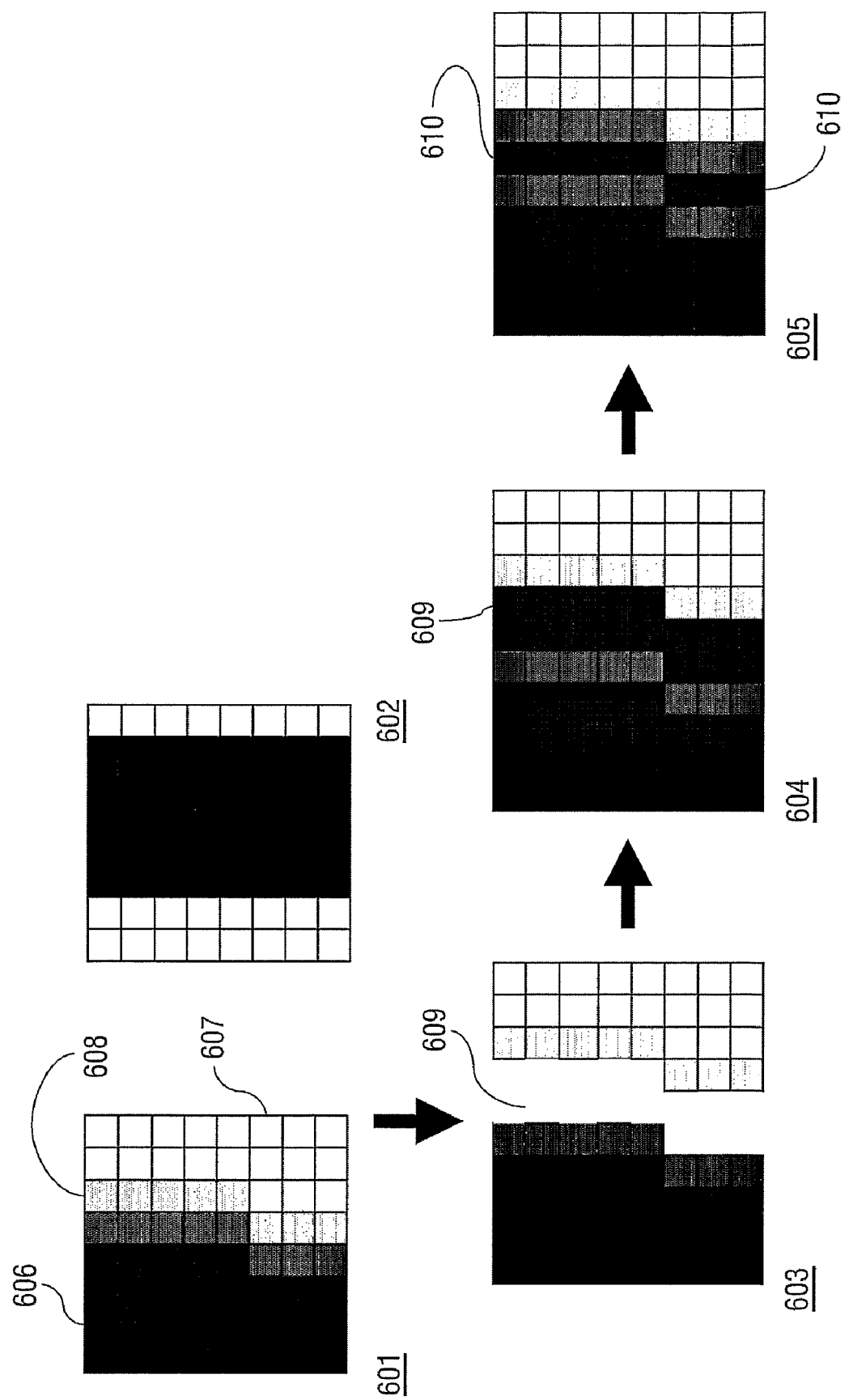
FIG. 6 shows a schematic representation of the occurrence of ghost artifacts.

With reference to FIG. 6, the occurrence of ghost line artifacts when pixels from a hidden layer are included in an output image will be described. The image processing system receives an input image 601 and a hidden image 602 at the input. The input image 601 is associated with the input viewpoint and shows, for example, a dark foreground object 606 and light background object 607. Due to pre-filtering of the camera that records the original video, the pixels at the depth boundary 608 comprise some color of both, the dark foreground and the light background object. Depending on the chosen embodiment the hidden image 602 is either associated with the input viewpoint or the output viewpoint. Transformation of the input image 601 to an output viewpoint may result in a de-occluded area 612 in the viewpoint transformed input image 603. This de-occluded area 612 is filled with pixels from the hidden image 602 and a filter is applied. It depends on the viewpoint the hidden image 602 is associated with, whether the hidden image 602 is to be transformed before the hidden image pixels can be used for filling the de-occluded area 612. Due to the pre-filtering some pixels which before transformation were located at the original depth boundary in the input image will still comprise some color of both the foreground and the background object. The transformation results in a new depth boundary in the output image 605. As a consequence the output image 605 comprises two different depth boundaries and a ghost line artifact 610 appears.

Figure 7:
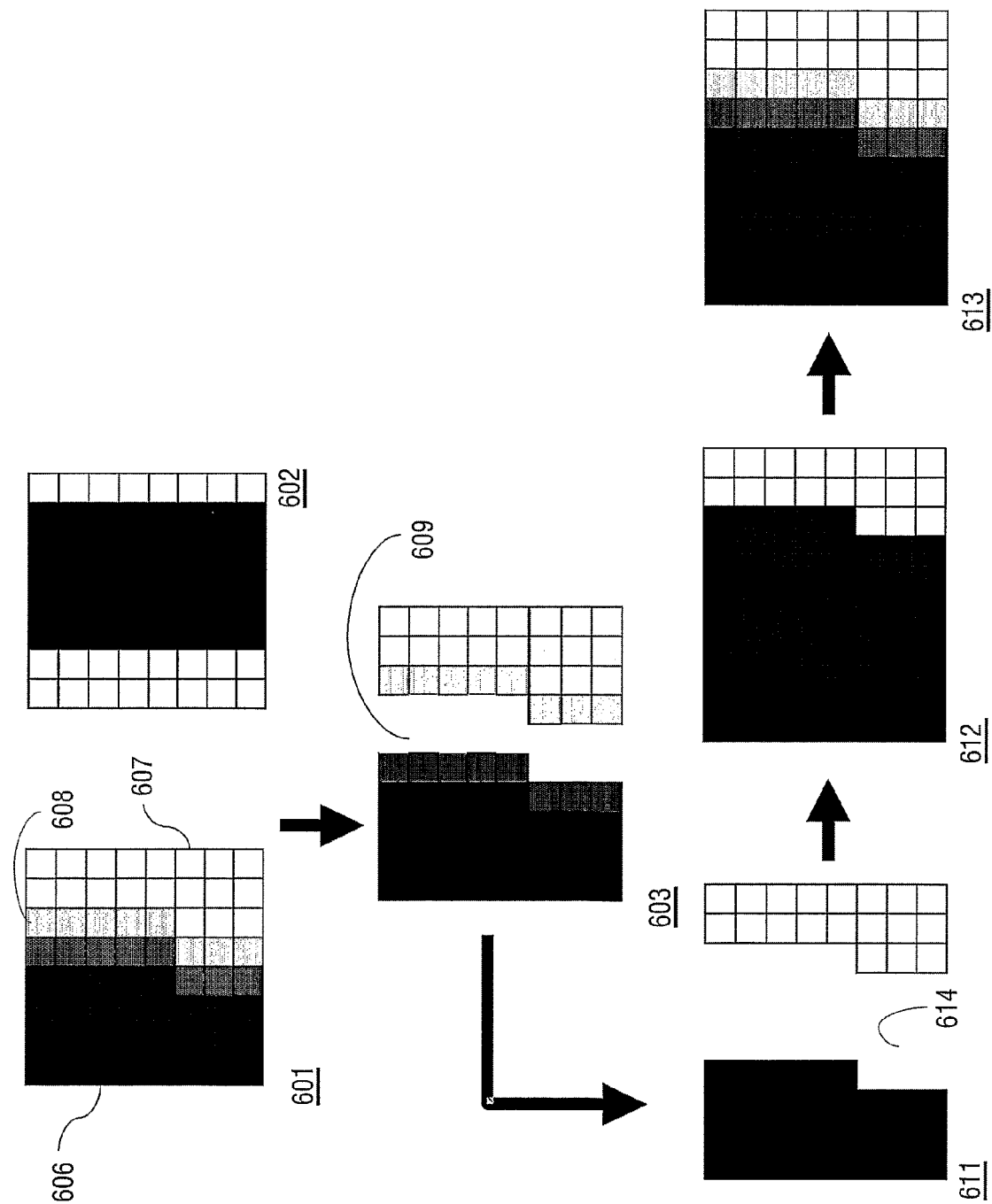
FIG. 7 shows a schematic representation of the preventing of ghost artifacts.

With reference to FIG. 7, the preventing of ghost line artifacts 610 as performed by the image processing system according to the invention will be described. In this system not only the pixel positions in the de-occluded area 609 are filled with pixels from the hidden image 602. Also one or more pixels adjacent to the de-occluded area are taken from the hidden image 602. As a consequence an enlarged de-occluded area 614 is created and the pixels with color from both the foreground and the background are not part of the output image anymore. A filtering process is applied to the transformed pixels and an output image 613 without ghost artifacts is the result.

Figure 8:
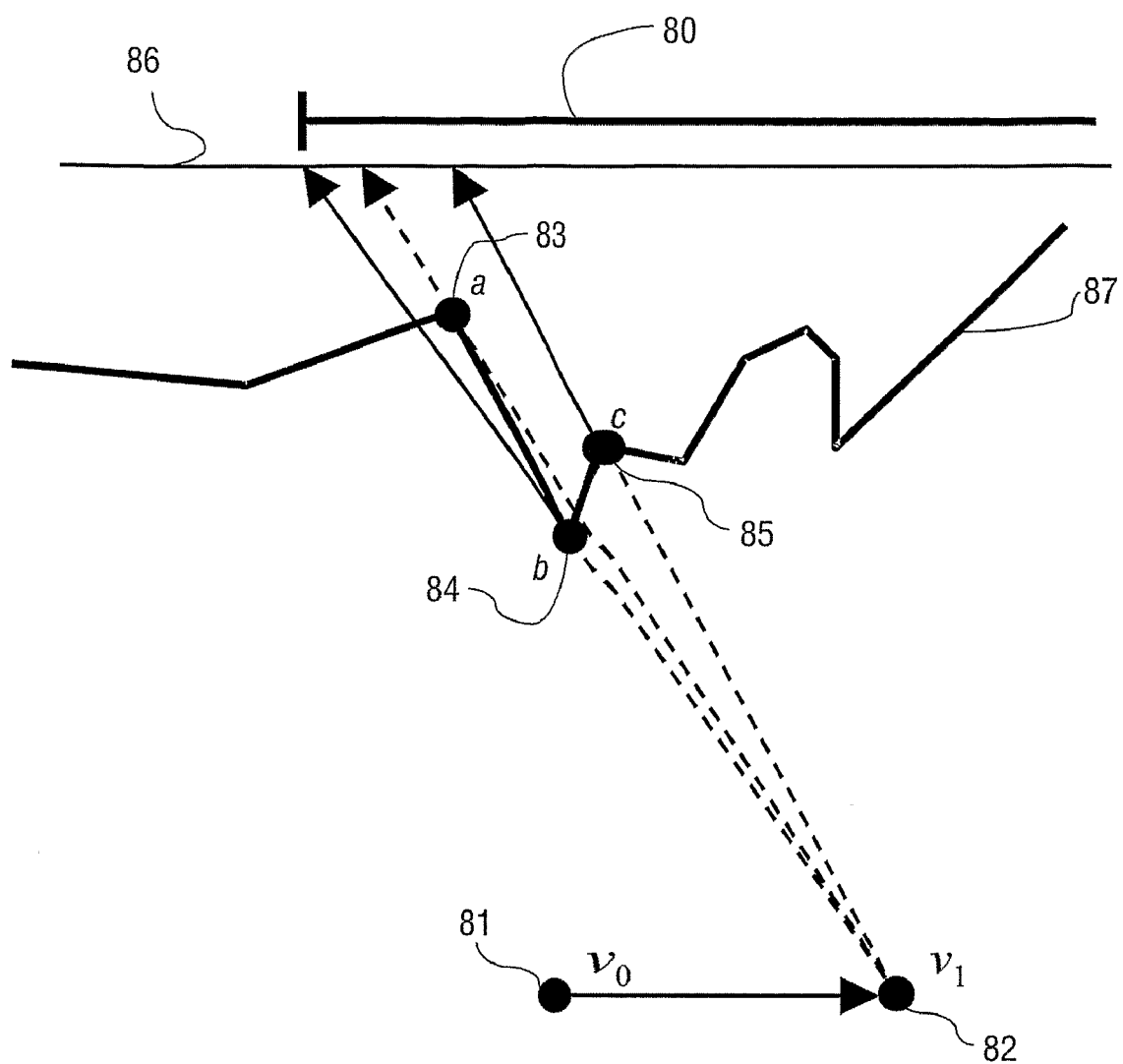
FIG. 8 illustrates detection of occlusions, using an x-coordinate extent.

FIG. 8 illustrates detection of occlusions, using an x-coordinate extent 80. Occlusions are for example detected as follows. The video processor 106 is operative to sequentially process a scan line, i.e. a row with input pixels, in a direction opposite to a displacement from the input viewpoint $v_0$ 81 to the output viewpoint $v_1$ 82. The processing includes transforming input pixels to output pixels as a function of the associated input pixel depth. The projected pixels of pixels a 83, b 84 and c 85 are part of the input image associated with the viewpoint $v_0$ 81. With the transformation to the output image 86 associated with the viewpoint $v_1$ 82 pixel a 83 gets occluded. The pixels b 84 and c 85 are not occluded and are mapped onto the output image 86. The processing may include maintaining an x-coordinate extent 80 that indicates for already processed input pixels with respect to a predetermined start position a furthest x-coordinate already occluded by at least one transformed input pixel. Then, it can be concluded that if a pixel that is transformed does not lengthen the extent, it must be occluded by the previously processed pixels. In this event the pixel transformed from pixel a 83 does not lengthen the extent because it is occluded by the pixels transformed from pixel b 84. Therefore pixel a 83 is not included in the output image 86. For a viewpoint transformations $v_1 < v_0$, the argument is analogous. In that event the scan line is traversed with increasing x-coordinate. Similarly, if a pixel that is transformed does lengthen the extent by more than a predetermined threshold, for example 1.5 pixels, part of the hidden image is de-occluded and at least one hidden image pixel is inserted in the output image 86.

In order to be able to efficiently fill in contributions from the hidden layer, it is preferred to interleave processing of the base image layer, and the hidden layer. For both scans, the extent in the output scan line may be maintained. In this way, only a single scan over the base image scan line is performed interleaved with a single scan over the hidden image scan line. Specifying the pixels of the hidden layer in the coordinate frame of the base image allows for easy integration of the transformed input image and the transformed hidden image.

Figure 9:
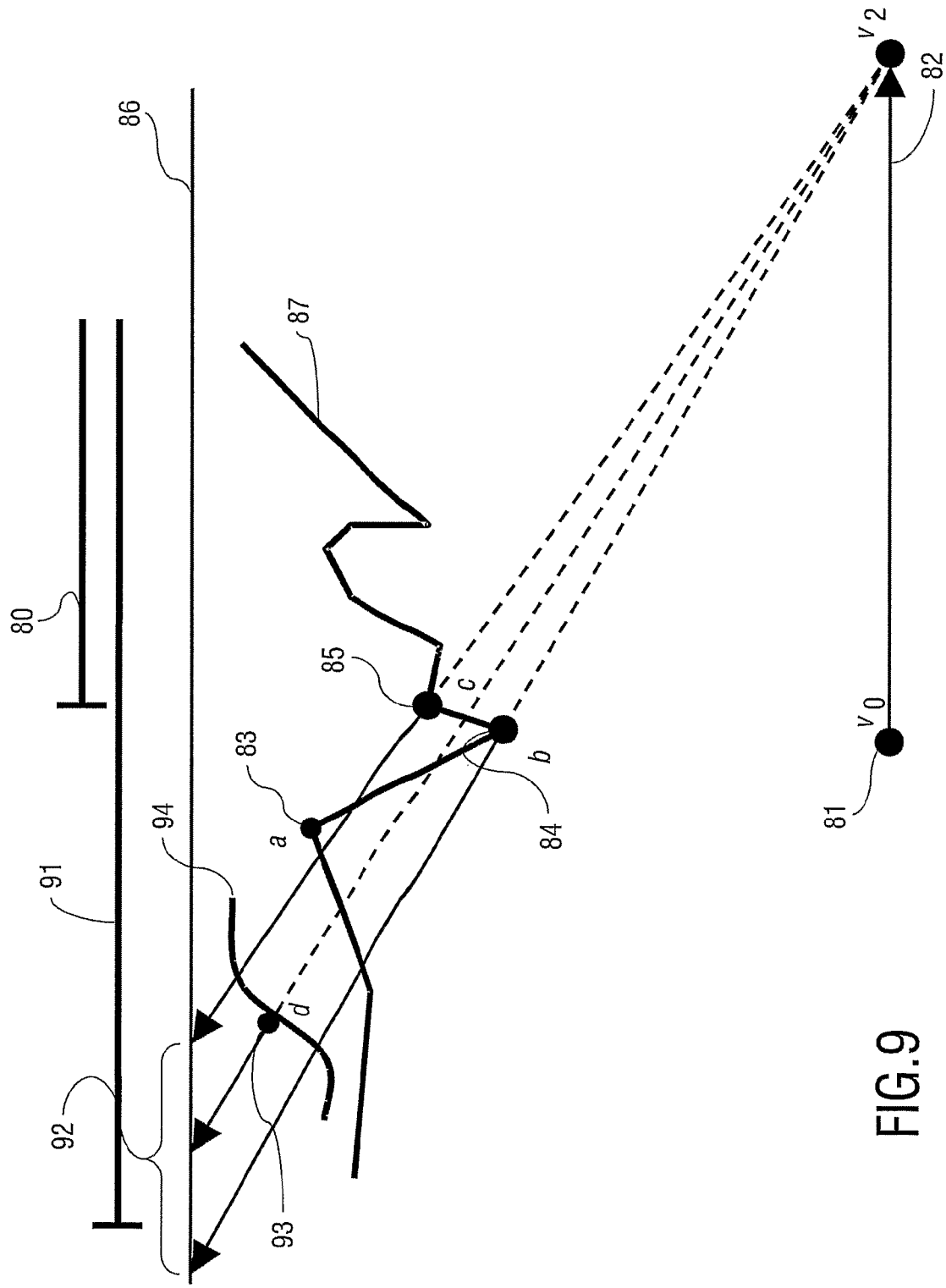
FIG. 9 illustrates detection of de-occlusions, using a look ahead extent.

In an embodiment of the image processing system according to the invention ghost line artifacts are detected as illustrated in FIG. 9. FIG. 9 shows the transformation of the input image shown in FIG. 8, transformed to an output image associated with viewpoint $v_2$ ($v_2 > v1$). In this embodiment of the image processing system, de-occlusions are detected using a look ahead extent 91. The x-coordinate extent 80 maintains the input pixels which, after transformation, are fed to a filter that prefilters and samples the output scan line at screen resolution. The look ahead extent 91 which is ahead of the x-coordinate extent 80 detects possible areas of occlusion, minification, magnification and/or de-occlusion. If a pixel, after transformation, does lengthen the look ahead extent 91 by more than a predetermined threshold, preferably 1.5 pixels, an area of de-occlusion is detected. For example after the viewpoint transformation from viewpoint $v_0$ to $v_2$ shown in FIG. 9 a de-occluded area 92 occurs between the pixels b 84 and c 85. First the de-occlusion is detected by the look ahead extent 91. Later the x-coordinate extent 80 reaches the de-occluded area and the de-occluded pixel d 93 from the hidden layer 94 is inserted in the output image 86. In order to prevent ghost line artifacts preference to the hidden layer 94 is given for pixel positions adjacent to the de-occluded hidden image pixels. Preferably one to four pixel positions before and/or after the de-occluded area are filled by pixels from the hidden image 94. In the filter color values of pixels are accumulated, which makes it extremely difficult to replace already processed pixels. Therefore the detection of the de-occluded area has to take place before the input samples to be replaced are fed to the filter. Using a look ahead extent 91 enables early detection of a de-occluded area.

Figure 10:
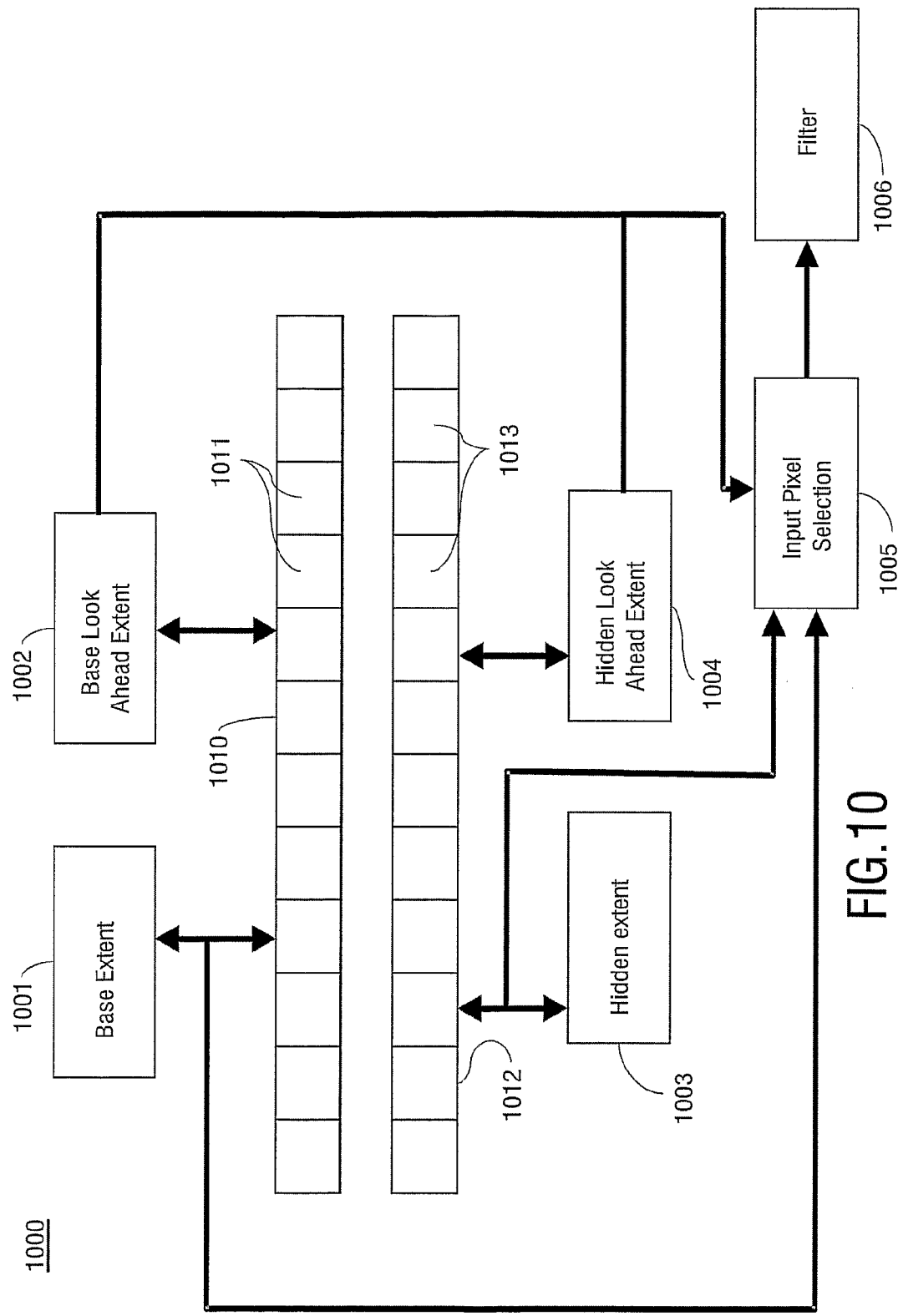
FIG. 10 shows a block diagram of part of a video processing system according to the invention.

FIG. 10 shows a schematic view of an embodiment 1000 of the image processing system according to the invention. The system uses four different extents. A base x-coordinate extent 1001 and a base look ahead extent 1002 are used for transforming the input pixels and detecting de-occluded areas in the transformed input image 1010, respectively. A hidden x-coordinate extent 1003 and a hidden look ahead extent 1004 simultaneously do the same for the hidden image 1012. Preferably extra hidden layers are available and an x-coordinate extent and a look ahead extent are provided for each hidden layer. Besides predetecting de-occluded areas the hidden look ahead extents may be used for determining if a hidden image pixel is available for inserting in or adjacent to a de-occluded area. When no hidden image pixel is available for filling a de-occluded area, the area may be filled using known methods such as linear interpolation. The video processor 106 is operative to detect for each input pixel 1011 of the input image 1010 how much the pixel lengthens the base look ahead extent 1002 after transformation. If a pixel after transformation lengthens the look ahead extent by more than a predetermined threshold, for example 1.5 pixels, a de-occlusion is detected. Transformed pixels from the input image 1010 and the hidden image 1012 are fed to an input pixel selection unit 1005. The input pixel selection unit 1005 may be implemented as software or in hardware components in the video processor. The input pixel selection unit 1005 selects, based on information from the look ahead extents, which transformed pixels will be part of the output image. The selected pixels are fed to a video filter block 1006 before being displayed on a suitable display. According to the invention, if a de-occluded area is detected by the look ahead extent 1002, near the de-occluded area preference is given to the transformed pixels of the hidden image 1012 when the input pixel selection unit 1005 feeds pixels to the video filter block 1006. Hereby ghost artifacts near depth discontinuities are prevented. The pixel selection unit 1005 may be operative to determine if a hidden image pixel is available for inserting into the output image. If not, transformed input pixels known methods such as linear interpolation may be used for filling the de-occluded area and the adjacent pixel positions.

Figure 11:
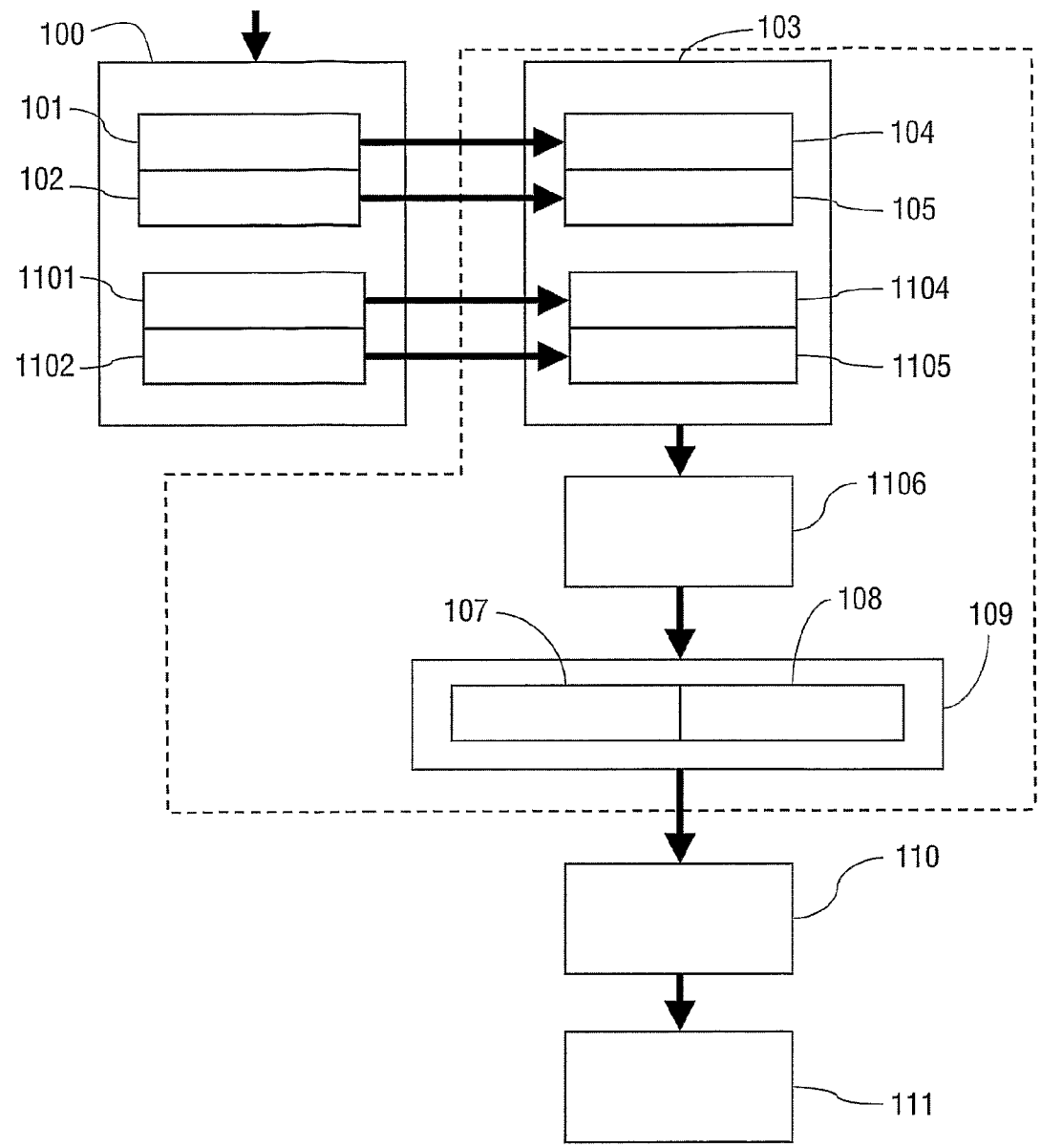
FIG. 11 shows a block diagram of a system in which the image processing system of the invention is advantageously used.

FIG. 11 shows a block diagram of a system in which the image processing system of the invention is advantageously used. The system shown in FIG. 11 is an enhanced version of the conventional system shown in FIG. 1. Additional to the input image 101 and the input depth 102 the memory 100 receives a hidden image 1101 and, optionally, hidden image pixel depth values. If a memory 103 is used for storing a copy 104 of the input image 101 and a copy 104 of the input depth 102, this memory further stores copies 1104 and 1105 of the hidden image pixels 1101 and the hidden image pixel depths 1102. The processor 1106 is operative to create output pixels of the output image. The output pixels are created as described above. The processor 1106 may be operative to transform the input image to an output image associated with a predetermined output viewpoint. In that event, the hidden image may not have to be transformed. In an embodiment of the system according to the invention the output viewpoint is chosen by an end user and both the input image pixels and the hidden image pixels are transformed to transformed pixels, associated with the output viewpoint.

It should be mentioned that the above mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An image processing system for generating at least one output image associated with an output viewpoint from an input image associated with an input viewpoint through a depth-dependent transformation; the images being represented as an input pixel array and an output pixel array, respectively; the image processing system comprising:
   an input for receiving (i) the input image and (ii) a hidden image, the input image (i)(a) being a pre-filtered 2D representation of 3D objects as seen from the input viewpoint, and (i)(b) comprising for each input pixel an associated input pixel value and an associated input pixel depth, the hidden image (ii)(a) being another 2D representation of the 3D objects and (ii)(b) comprising information, for each hidden image pixel an associated hidden image pixel value and an associated hidden image pixel depth, which information is at least partly occluded from the input viewpoint;
   a video processor being operative to create output pixels of the output image by:
   transforming each input pixel of the input image to a transformed input pixel, associated with the output viewpoint, as a function of the input pixel depth, and
   creating the output image based on the transformed input pixels of the input image, using (iii) hidden image pixels (iii)(a) for filling de-occluded areas of the transformed input pixels of the input image and (iii)(b) for filling at least one pixel position adjacent to the de-occluded areas of the transformed input pixels of the input image (iii)(c) to create enlarged de-occluded areas filled with pixels of the hidden image for preventing ghost line artifacts, caused by transformation of the pre-filtered input image; and
   an output for providing the output image for subsequent rendering.

2. The image processing system as claimed in claim 1, wherein the depth-dependent transformation is a transformation from the input viewpoint to a predetermined output viewpoint and wherein the hidden image is associated with the output viewpoint.

3. The image processing system as claimed in claim 1, wherein the hidden image is associated with the input viewpoint and the hidden image pixels are associated with a hidden image pixel value and a hidden image pixel depth, the video processor being operative to:
   transform each hidden image pixel to a transformed hidden image pixel, associated with the output viewpoint, as a function of the hidden image pixel depth; and
   create the output image using transformed hidden image pixels for filling de-occluded areas and for at least one pixel position adjacent to the de-occluded areas.

4. The image processing system as claimed in claim 1, wherein rows of pixels of the pixel arrays are used for horizontal display on successive display lines and the video processor is operative to sequentially process input pixels per row of corresponding pixel arrays of the input image and the hidden image.

5. The image processing system as claimed in claim 4, wherein said image processing system further comprises:
   pixel selection means for sequentially selecting input pixels per row, selecting
   (a) a hidden image pixel for:
   (a) (1) pixel positions in a de-occluded area;
   (a) (2) pixel positions defined by a first number of pixel positions before the de-occluded area; and
   (a) (3) pixel positions defined by a second number of pixel positions after the de-occluded area,
   wherein one selected from the group consisting of (i) the first number, (ii) the second number, and (iii) both the first number and the second number is greater than zero; and
   (b) transformed input pixels for other pixel positions on the display line.

6. The image processing system as claimed in claim 5, wherein the one selected from the group consisting of (i) the first number, (ii) the second number, and (iii) both the first number and second number of pixel positions is dependent on a width of a horizontal pre-filter, used during recording of the input image.

7. The image processing system as claimed in claim 5, wherein the one selected from the group consisting of (i) the first number, (ii) the second number, and (iii) both the first number and second number of pixel positions is received at the input as additional information about the input image.

8. The image processing system as claimed in claim 5, wherein the one selected from the group consisting of (i) the first number, (ii) the second number, and (iii) both the first number and second number of pixel positions is determined based on an analysis of the input image.

9. The image processing system as claimed in claim 5, each input pixel being indicated by an x-coordinate and an y-coordinate, the video processor being operative to sequentially process input pixels of a row in a direction opposite to a displacement from the input viewpoint to the output viewpoint along the x-axis; the processing including:
   maintaining an x-coordinate extent that indicates for already processed input pixels with respect to a predetermined start position a furthest x-coordinate already occluded by at least one transformed input pixel, where the furthest x-coordinate is a highest x-coordinate if the processing direction is from left to right and a lowest x-coordinate if the processing direction is from right to left; and
   maintaining a look ahead extent for determining ahead of the x-coordinate extent that a hidden image pixel is de-occluded if a transformed input pixel increases the look ahead extent by more than a predetermined threshold for enabling the pixel selection means to select a hidden image pixel for the first number of pixel positions before the position of the de-occluded area.

10. The image processing system as claimed in claim 3, wherein the video processor is operative to maintain a hidden image x-coordinate extent for indicating for already processed hidden image pixels with respect to a predetermined start position a furthest x-coordinate already occluded by at least one transformed hidden image pixel, where the furthest x-coordinate is a highest x-coordinate if the processing direction is from left to right and a lowest x-coordinate if the processing direction is from right to left.

11. The image processing system as claimed in claim 9, wherein the look ahead extent is a number of pixels ahead of the x-coordinate extent, said number being equal to a number of transformed hidden image pixels to be inserted before the position of the de-occluded area.

12. The image processing system as claimed in claim 1, wherein the input is arranged for receiving at least one additional hidden image, the additional hidden image comprising information, said information being at least partly hidden by objects in other hidden images, and the video processor being operative to create output pixels of the output image dependent on the depth dependent transformation, the input image, the hidden image and the at least one additional hidden image.

13. The image processing system as claimed in claim 9, wherein the video processor is operative to maintain a hidden image x-coordinate extent for indicating for already processed hidden image pixels with respect to a predetermined start position a furthest x-coordinate already occluded by at least one transformed hidden image pixel, where the furthest x-coordinate is a highest x-coordinate if the processing direction is from left to right and a lowest x-coordinate if the processing direction is from right to left.

14. The image processing system as claimed in claim 13, wherein the look ahead extent is a number of pixels ahead of the x-coordinate extent, which number is equal to a number of transformed hidden image pixels to be inserted before the position of the de-occluded area.

15. A method for generating, via an image processing system, at least one output image associated with an output viewpoint from an input image associated with an input viewpoint through a depth-dependent transformation; the images being represented as an input pixel array and an output pixel array, respectively; the method comprising:
   receiving, via an input of the image processing system, (i) the input image and (ii) a hidden image, (i)(a) the input image being a pre-filtered 2D representation of 3D objects as seen from the input viewpoint, and (i)(b) comprising for each input pixel an associated input pixel value and an associated input pixel depth, the hidden image (ii)(a) being another 2D representation of the 3D objects and (ii)(b) comprising information, which information is at least partly occluded from the input viewpoint;
   creating, via a video processor of the image processing system output pixels of the output image by:
   transforming each input pixel of the input image to a transformed input pixel, associated with the output viewpoint, as a function of the input pixel depth, and
   creating the output image based on the transformed input pixels of the input image, using (iii) hidden image pixels (iii)(a) for filling de-occluded areas of the transformed input pixels of the input image and (iii)(b) for filling at least one pixel position adjacent to the de-occluded areas of the transformed input pixels of the input image (iii)(c) to create enlarged de-occluded areas filled with pixels of the hidden image for preventing ghost line artifacts, caused by transformation of the pre-filtered input image; and providing the output image for subsequent rendering.

16. A non-transitory computer-readable media embedded with a computer program having program instructions operative to cause a processor to perform the method as claimed in claim 15, when executed by the processor.

* * * * *